July 5, 1932.  F. R. SHAUGHNESSY  1,866,227
PLANETARY STIRRING MACHINE
Filed Oct. 15, 1930   2 Sheets-Sheet 1
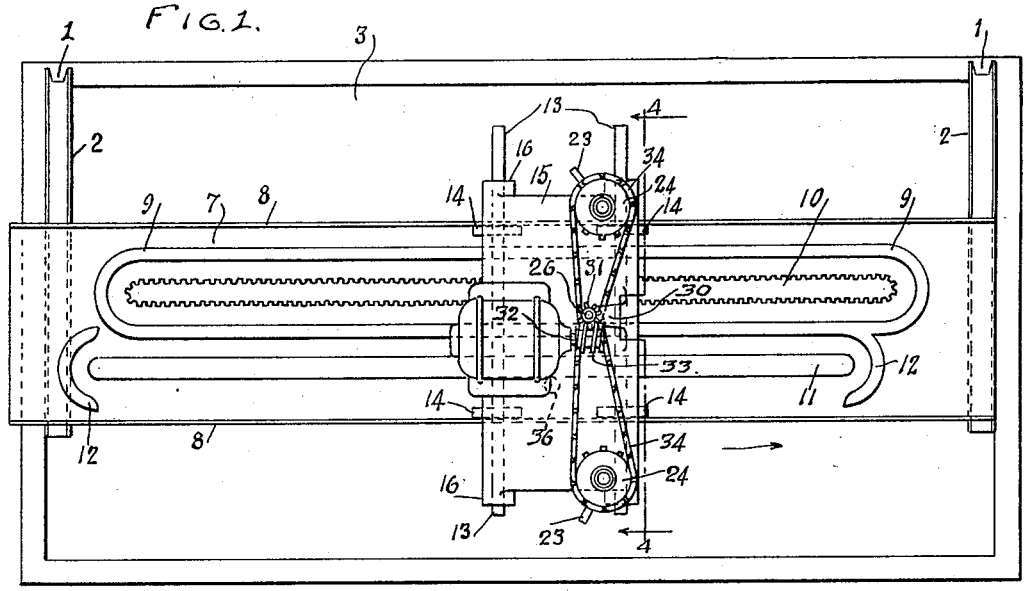
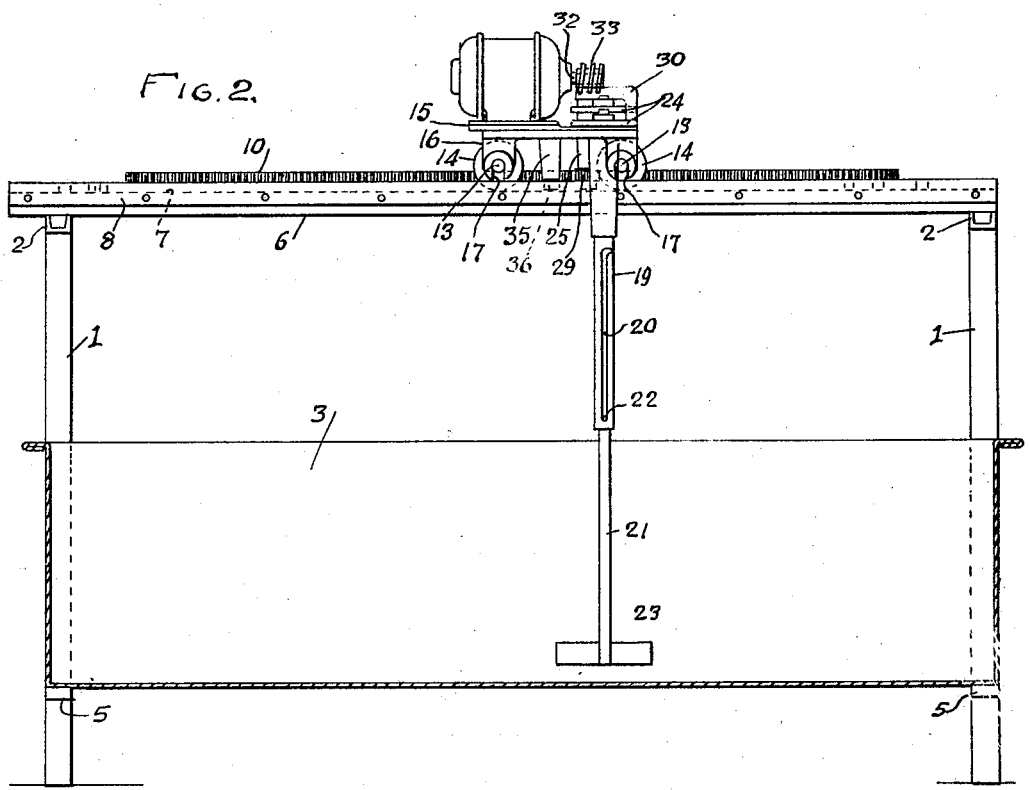
FRANK R. SHAUGHNESSY,
BY Toulmin + Toulmin
Attorneys

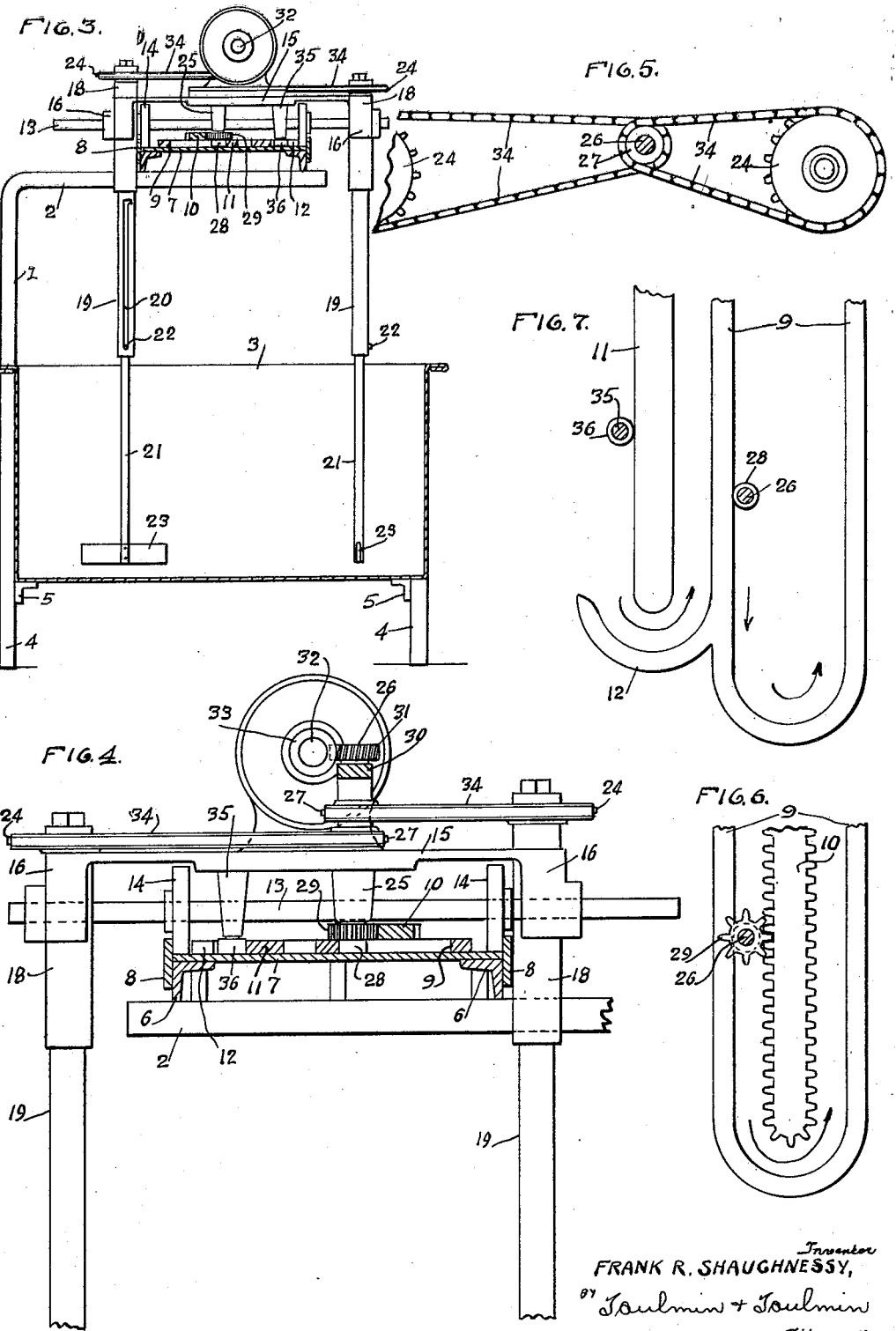

Patented July 5, 1932

1,866,227

UNITED STATES PATENT OFFICE

FRANK R. SHAUGHNESSY, OF TROY, OHIO

PLANETARY STIRRING MACHINE

Application filed October 15, 1930. Serial No. 488,861.

This invention relates to improvements in stirring machines, and has for its object to provide, in connection with a pan, a means to travel transversely and longitudinally of the pan for stirring the contents of the pan.

It is particularly the object of this invention to provide in a stirring machine a support for a traveling stirrer located above the pan containing the material to be stirred, the support having thereon a planetary gearing for moving longitudinally thereof and transversely thereof the stirring means supported thereon.

It is also an object of this invention to provide a horizontally disposed trackway on which there is located and supported a stirrer. This stirrer is adapted to be moved longitudinally or transversely of the trackway, and for thus moving the stirrer there is provided a planetary operating and guiding means for thus moving the stirrer.

It is also the object of this invention to provide, in connection with a planetary moving means for the stirring apparatus, means for operating the gearing that moves the stirrer longitudinally and transversely, and at the same time rotate the stirrer.

These and other advantages will appear from the following description taken in connection with the drawings.

Referring to the drawings:

Figure 1 is a top plan view of the machine.

Figure 2 is a side elevation of the stirrer, and a longitudinal section of the pan.

Figure 3 is a vertical cross section on the line 3—3 of Figure 1.

Figure 4 is a vertical cross section on the line 4—4 of Figure 1.

Figure 5 is a top plan view of the sprocket wheel and chains used for driving the stirrers.

Figure 6 is an end view of the planetary means for longitudinal and transverse movements of the stirrers.

Figure 7 is a view showing one end of the guides constituting a part of the planetary movement.

The numeral 1 is used to designate posts, two on one side of the machine. These posts extend upwardly and are bent laterally in a horizontal direction to form cross arms 2. Supported adjacent the lower end but slightly removed from the end thereof is a pan 3. The pan is supported at one side by the posts or supports 1, while it is supported on the other side by legs 4. In order to properly support the pan on the posts and legs, cleats 5 are provided at the point where the pan and the posts meet. The posts and legs, with the pan, constitute the lower supporting frame structure of the whole machine.

Extending longitudinally across the arms 2 are beams 6. These beams are supported upon the arms 2 in any suitable manner and have extending from one to the other the full length of the beams, a track 7 in the form of a platform. This platform or trackway is rectangular in shape, and has on each lateral side thereof a guide 8. These guides, with the platform or trackway 7, constitute a trough for supporting and conveying longitudinally of the support members the superstructural part of the stirring apparatus.

Located on the trackway intermediate the guides 8 is a guide 9 in the form of a continuous long loop. This guide is shown in Figure 1, and has extending from adjacent one end to adjacent the other end a rack 10. This rack has on each side and each end teeth to be engaged by a pinion, to be described later on. This rack and guide 9 constitute a passageway for controlling the movement of the stirrer. Adjacent the guide loop 9 is a guide member 11. This member 11 is substantially the same length that the rack bar 10 is but has the ends offset slightly from the ends of the rack. Fitting around each end of the guide member 11 and spaced therefrom the same distance that the loop or guide 9 is from the end of the rack 10, is a guide 12. The purpose of these loops will be set out later.

Supported on the trackway is a truck member which has one or more axles 13. On each axle, slightly remote from the end thereof, is a wheel 14. These wheels rest upon the trackway adjacent the guides 8 so that these axles with their wheels may be rolled along the trackway longitudinally but cannot slip to one side as they travel. Supported by the axles and wheels is a carriage frame 15, which has extending downwardly from each side brackets 16 that have slots 17 therein to receive the ends of the axles. There are as many of these brackets as there are axle ends so that the frame is supported by the ends of the axles.

Located on each side of the carriage frame adjacent one of the axles is a bearing 18 for supporting a paddle shaft 19. This paddle shaft is in two sections, the upper section being supported by the bearing and the lower section supported by the upper section. The upper section is hollow and has in one side thereof a bayonet slot 20. The lower section 21 fits within the upper section and is adapted to slide up and down therein, with a pin 22 fitting in the slot 20. In Figure 3 the parts of the stirrer shaft are shown in stirring or lower position.

Whenever the part 21 is elevated so that the pin 22 is brought into the bayonet part of the slot, by moving the stirrer 23 about ninety degrees the lower part of the shaft is supported by the upper part in elevated position. On the lower end of each lower section of the stirrer shaft is a stirrer paddle 23. On the upper end of each paddle shaft is a sprocket wheel 24 firmly attached thereto for rotating the stirrer shaft and the stirrer paddle on the lower end thereof.

Extending downwardly from the carriage frame is a bearing 25 in which a vertical shaft 26 is located. On the upper end of this shaft is a pair of sprocket wheels 27, while on the lower end is a guide roller 28 for engaging the guide 11 and the loops 12 in the forward and lateral movements of the carriage frame. Just above the guide roller 28 and attached rigidly to the shaft 26 is a pinion 29 which meshes with the teeth on the rack bar 10 so that as the shaft 26 rotates the carriage frame will be moved along the trackway, and as it gets to the end of the bar 10 will be guided around and onto the other side of the rack bar. This guiding is effected by means of the loop around the bar 10 and by the loops at the ends of the guide 11.

The upper end of the shaft 26 is supported by a bracket 30, as shown in Figure 2. Located at a suitable point on the shaft 26 is a worm gear 31 engaged by a worm 33 on the motor shaft 32, and connecting one of the sprockets on the shaft 26 to the sprocket on the upper end of the stirrer shaft is a sprocket chain 34. There are two of these chains, one for each stirrer shaft, and the sprocket on the upper end thereof for connecting it to one of the sprockets on the shaft 26.

Extending downwardly from the frame is a post 35 which carries on the lower end thereof a roller 36. This roller is to engage the guide member 11 in the forward and backward movement of the apparatus on the trackway. This roller, in cooperation with roller 28, assists in keeping the carriage frame in proper transverse position while the carriage moves on the trackway, due to the operation of the pinion on the lower end of shaft 26.

In the position as shown in Figure 1 assume that the carriage frame is moving toward the righthand end of the trackway. The roller 26 is on the lower side of the guide member 11 while the roller 28 engages the lower side of the loop member 9, the pinion engaging the lower side of the rack bar 10. The shaft 26 is rotating in such a direction that the carriage travels toward the left. When the pinion reaches the end of the rack bar 10 it travels around it and enters the space between it and the upper branch of the guide member so that the whole stirring apparatus is moved in a position toward the top of the drawings, and due to the continued operation of the pinion, the carriage frame travels toward the left.

As the carriage frame is shifting from one position to another position transversely of the trackway, the roller 36 passes around the righthand end of the guide member 11 and in so doing is guided by the loop 12 at the righthand end, as shown in Figure 1. This action continues until the carriage frame reaches the lefthand end, where the operation of the pinion and the rack tends to shift the carriage frame laterally so that it will travel then again toward the righthand end.

It will be observed that the roller 36 is slightly offset longitudinally from the roller 28. This arrangement of the rollers assists in keeping the carriage frame in proper longitudinal arrangement in relation to the trackway, and assists the wheels 14 in maintaining the carriage frame in proper position. And it is in order to accommodate this relative change of positions that the loops at the ends of the bar 10 and the guide member 11 are offset longitudinally one with relation to the other, as distinctly shown in Figure 1 both at the righthand and the lefthand end thereof.

In order to secure a firm and solid structure the parts herein described and shown are welded one to the other, except such parts as are movable. All fixed parts are welded or may be united by any other suitable means. Preferably welding is used.

I desire to comprehend within my invention such modifications as may be embraced within my claims and the scope of my invention.

Having thus fully described my invention, what I claim is new and desire to secure by Letters Patent, is:

1. In a stirrer mechanism, stirring means, a rack bar having a guide bar around it, and a rotatable means for operating said stirring means and engaging said rack bar and guide bar whereby as it rotates it travels along the bar and rotates and stirring means.

2. In a stirrer mechanism, a platform support, a rack bar having a guide bar around it on said support, stirring means on said support, and means engaging said rack bar and guide bar for rotating said stirring means and causing it to travel with respect to the support.

3. In a stirrer mechanism, a track member, a double rack bar on said track member having a guide member around it, stirring means on said track member, and rotatable means engaging the rack bar and guide member and operatively connected to the stirring means whereby the rotation of the rotatable means will cause the stirring means to operate and travel along the trackway.

4. In a stirrer mechanism, a platform serving as a trackway, a rack bar on said trackway and having on each side and each end teeth, guide means surrounding said rack bar, stirring means supported on said trackway for longitudinal and transverse movement, and means engaging the rack bar and guide means for guiding the stirring means and moving it longitudinally and transversely of the trackway.

5. In a stirrer mechanism, in combination with a pan, a trackway connected to said pan, a carriage on said trackway, said carriage comprising an axle with wheels thereon, and a carriage frame supported by said axle for longitudinal movement thereon transverse the trackway and carriage, a stirrer on said carriage frame and extending into said pan, and means for moving the carriage frame longitudinally and transversely of the trackway.

6. In a stirrer mechanism, in combination with a pan, supports extending over said pan, a trackway on said supports, a planetary gear on said trackway, said planetary gear comprising a rack bar having teeth around it, and a guide member around the rack bar, and means for operating the stirrer and moving the carriage along the trackway, said means including a shaft having a pinion engaging said rack bar and a roller engaging said guide member.

7. In a stirrer mechanism, in combination with a trackway having a planetary gear thereon, a carriage on said trackway, said carriage including roller support means guided by the trackway and a frame supported by the roller support means for movement thereon transverse the trackway, and means engaging the planetary gear for moving the carriage along the track and the frame transverse the track independent of the roller support means.

8. In a stirrer mechanism, in combination with a trackway having thereon a planetary gear and a guide, a carriage on said trackway, said carriage including roller support means guided by said trackway, and a frame supported by the roller support means for movement thereon transverse the trackway, and means for moving the carriage along the trackway and the frame transverse the trackway independent of the roller support means, said means including a shaft having a pinion engaging the planetary gear and a roller engaging the guide.

9. In a stirrer mechanism, in combination with a trackway having thereon a rack bar with teeth on both sides and both ends, a guide member surrounding said rack bar and a second guide member parallel to the rack bar and having a loop about each end, a carriage on said trackway, said carriage including roller support means guided by said trackway and a frame supported on said roller support means for movement thereon transverse the trackway, and means for moving the carriage along the trackway and the frame transverse the trackway independent of the roller support means, said means including a shaft having a pinion engaging the rack bar, a roller engaging the guide member surrounding the rack bar, and a roller engaging the second guide member and the loops about the end thereof.

10. In a stirrer mechanism, in combination with a trackway having thereon a planetary gear, a guide member surrounding the planetary gear, and a second guide member, a carriage on said trackway, said carriage including a roller support means and a frame on said roller support means adapted to move transverse the trackway and the roller support means, a stirrer supported by said frame, and means to operate the stirrer and to move the carriage along the trackway and the frame transversely of the trackway and the roller support means, said means including a shaft having a pinion engaging said planetary gear, a roller engaging said first-named guide member and a roller engaging the second guide member.

11. In a stirrer mechanism, in combination with a trackway having thereon a planetary gear, a guide surrounding said planetary gear, and a second guide, a carriage on said trackway, said carriage including a roller support and a frame on said roller support adapted to move transverse the trackway and the roller support, a stirrer on said frame having a sprocket wheel thereon, and means to operate the stirrer and to move the carriage along the trackway and the frame transversely of the trackway and the roller support, said means including a shaft having a pinion engaging the planetary gear, a roller engaging the first-named guide, a roller engaging the second guide and a sprocket wheel operatively connected to the first-named sprocket wheel.

12. In a stirrer mechanism, in combination with a container, supports for said container extending up one side and over the top thereof, a trackway on said supports over the container, a stirrer supported on said trackway adapted to move transversely and longitudinally thereof, and common means for operating said stirrer and moving it transversely and longitudinally of the trackway, said means including a planetary gear and a guide on the trackway and a pinion engaging the planetary gear and a roller engaging the guide, said pinion and roller being carried by the stirrer.

In testimony whereof, I affix my signature.

FRANK R. SHAUGHNESSY.